United States Patent [19]

Stanley

[11] Patent Number: 5,276,603
[45] Date of Patent: Jan. 4, 1994

[54] SIXTEEN LEVEL POWER SUPPLY WITH ASYNCHRONOUS CONTROLLER

[75] Inventor: Gerald R. Stanley, Osceola, Ind.

[73] Assignee: Crown International, Inc., Elkhart, Ind.

[21] Appl. No.: 1,400

[22] Filed: Jan. 6, 1993

Related U.S. Application Data

[63] Continuation of Ser. No. 737,780, Jul. 30, 1991, abandoned, which is a continuation-in-part of Ser. No. 518,759, May 3, 1990, Pat. No. 5,045,990.

[51] Int. Cl.$^5$ .......................................... H02M 7/537
[52] U.S. Cl. ........................................ 363/43; 307/48; 307/63
[58] Field of Search ................ 363/40, 43, 95, 97; 307/43, 48, 49, 63; 323/268, 271

[56] References Cited

U.S. PATENT DOCUMENTS

| | | | |
|---|---|---|---|
| 3,100,851 | 8/1963 | Ross et al. | 363/43 |
| 3,867,643 | 2/1975 | Baker et al. | 363/43 |
| 4,238,820 | 12/1980 | Naaijer | 363/43 |
| 4,775,923 | 10/1988 | Schmid et al. | 363/43 |

Primary Examiner—Steven L. Stephan
Assistant Examiner—Adolf D. Berhane
Attorney, Agent, or Firm—James D. Hall

[57] ABSTRACT

A sixteen level power supply including four voltage sources having stepped voltage values. The voltage sources are controlled by an electronic switch assembly and may be switched into series between the positive and negative output voltage terminals. The switches are controlled by a controller circuit which monitors voltage available at each voltage source in comparison to a demand signal. The controller output a digital control bit to activate each switch.

6 Claims, 4 Drawing Sheets

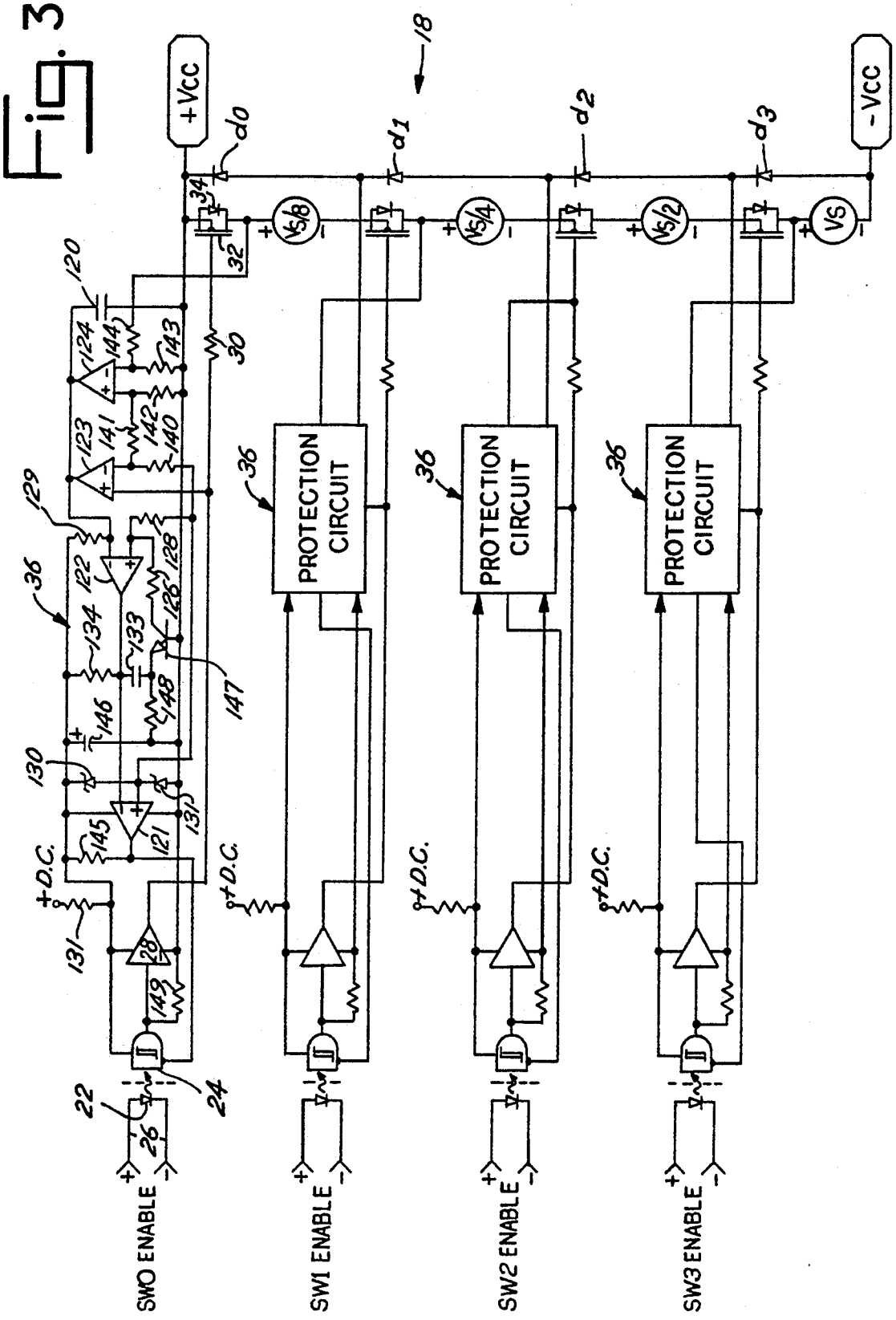

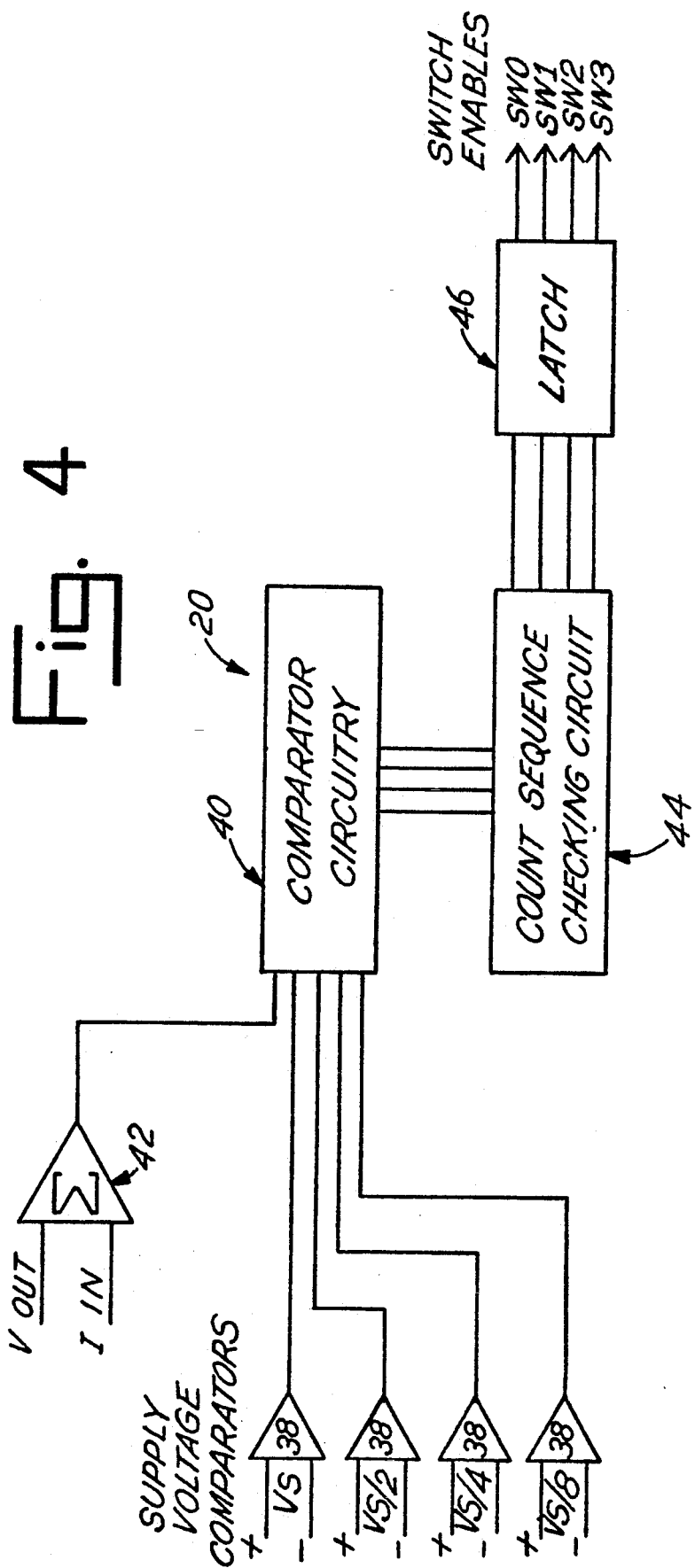

SIXTEEN LEVEL POWER SUPPLY WITH ASYNCHRONOUS CONTROLLER

This is a continuation of copending application Ser. No. 07/737,780 filed on Jul. 30, 1991; now abandoned, which is a continuation-in-part application Ser. No. 518,759, filed on May 3, 1990, now U.S. Pat. No. 5,045,990.

FIELD OF THE INVENTION

This invention relates to a power supply and will have specific relevance to a sixteen level power supply with a asynchronous controller.

BACKGROUND OF THE INVENTION

In industry, it is very often desirable to have an amplifier capable of producing a large amount of output power, typically in the range of several kilowatts. An example of where this output power is required would be in the field of AM radio where large amplifiers are used for transmitter modules. A problem associated with such large amplifiers is the generally poor efficiency of the amplifier which increases the amplifier operating cost and construction cost. This problem has been addressed in my U.S. Pat. No. 4,788,452 which discloses a power supply having voltage sources which may be switched from parallel to series with other voltage sources upon the required amplifier output increasing over a predetermined maximum. When the required voltage falls below a predetermined maximum, the voltage source is switched back into a parallel configuration with the other voltage sources to improve cooling and power dissipation of the amplifier thus increasing efficiency.

This solution is satisfactory for applications requiring only a few separate voltage levels. However, this solution is not acceptable in applications where a plurality of voltage levels are required for even greater amplifier efficiency. Using the prior art switchable power supply described above a sixteen level power output would require sixteen separate voltage sources and fifteen switches. Obviously, such an amplifier construction would be cost prohibitive and of little practical value.

SUMMARY OF THE INVENTION

The power supply and controller of this invention eliminates the limitations of the previous switchable power supply by providing four scaled voltage sources selectively switched into series with the voltage output terminals under command of a controller. The voltage sources and associated switches are interconnected to a controller which outputs a four bit binary control word. A digital control word of 0000 indicates all four voltage sources are off-line and 1111 indicates all voltage sources are on-line. It can therefore be seen that using common binary counting techniques the power supply of this invention has a possibility of 16 states which in association with four voltage sources with scaled voltages and switches translates into 16 distinct voltage levels.

The sixteen level controller of this invention includes voltage supply monitors and a summing circuit connected to the input of a comparator circuit. The output from the summing circuit represents the amplifier voltage demand signal and the voltage supply monitors represent the voltages available from each of the voltage sources. The comparator circuit converts the demand and available voltage signals into a four bit binary control word.

In essence the comparator circuit acts like a flash-converter. However a flash-converter would not function in place of the control as flash-converters generally have only one reference voltage. Further flash-converters are synchronously driven by an internal clock which poses problems of speed and noise. Many systems which will employ the power supply of this invention have rapidly changing amplifier signals which would not be responsively served by a clocked flash-converter. Further the environment in an amplifier is not suitable for an additional noise generating clock pulse.

The binary control word is passed from the comparator circuit to a sequence checking circuit to ensure proper binary sequencing on count up. The control word is passed from the sequence checking circuit to a latch circuit which delays passing the control word to the voltage supply switches on count down. The delay on countdown is necessary to prevent the switches from being driven at too high of a switch rate. The delay is a trade off between switch heating and excess amplifier heating. The delay also allows the voltage supply transients resulting from switching to clear so that subsequent controller choices are not affected. During count up, the latch circuit immediately passes the control word directly to the switches.

Therefore, the power supply and controller of this invention monitors the amplifier output and available voltage at the voltage sources and outputs a properly sequenced digital word to four power switches indicating which switches need to be turned on to satisfy the voltage required. The controller in association with four voltage sources and the corresponding switches provide a sixteen level asynchronous power supply for a large wattage amplifier.

Accordingly, it is an object of this invention to provide a multiple level power supply.

Another object of this invention is to provide for a multiple level power supply having a controller which passes a binary word to voltage source switches to control the operation of the switches.

Still another object of this invention is to provide for a sixteen level power supply and controller for a large wattage amplifier which is switched responsive to the amplifier's demand.

Still another object of this invention is to provide for a power supply for a large wattage amplifier having increased efficiency.

Other objects of this invention will become apparent upon a reading of the following description taken with the accompanying drawings.

BRIEF DESCRIPTION OF THE DRAWINGS

FIG. 3 is a schematical and block diagram illustration of the switches used in this invention. The figure also illustrates the orientation between the voltage sources and the switches.

FIG. 4 is a block diagram of the sixteen level controller of this invention.

DEFINITIONS

To promote an understanding of the invention it is best to define terms commonly used throughout in the specification.

The term "binary word" refers to a four bit word passed from the controller to the 16 level switch. Each bit determines the status of one of the switches within the 16 level switch and may be either a logical 1 or 0. A logical 1 indicates the switch is to be closed. A logical 0 indicates the switch is to be open.

"Count up/count down" refers to increasing or decreasing the value of the binary word.

"Demand signal" refers to the voltage level from a summing circuit reflective of the power supply voltage required by the amplifier. The demand signal is a result of the summed amplifier output voltage and signals proportional to output current.

"Switch" refers to an electrical circuit functioning as a single pole single throw switch.

"Voltage Source" refers to a secondary winding voltage rectified and unregulated. Four voltage sources (Vs, Vs/2, Vs/4 and Vs/8) are illustrated in this invention.

Op amp refers to an operational amplifier.

DESCRIPTION OF THE PREFERRED EMBODIMENT

The preferred embodiment herein disclosed is not intended to be exhaustive or to limit the invention to the precise form disclosed. Rather, it is chosen and described so that others skilled in the art might utilize its teachings.

To promote an easier understanding of the invention, the following description is subdivided and labeled accordingly. It should be noted that the sections generally refer to a particular figure of the application.

BASIC BLOCK DIAGRAM

Figure 1:
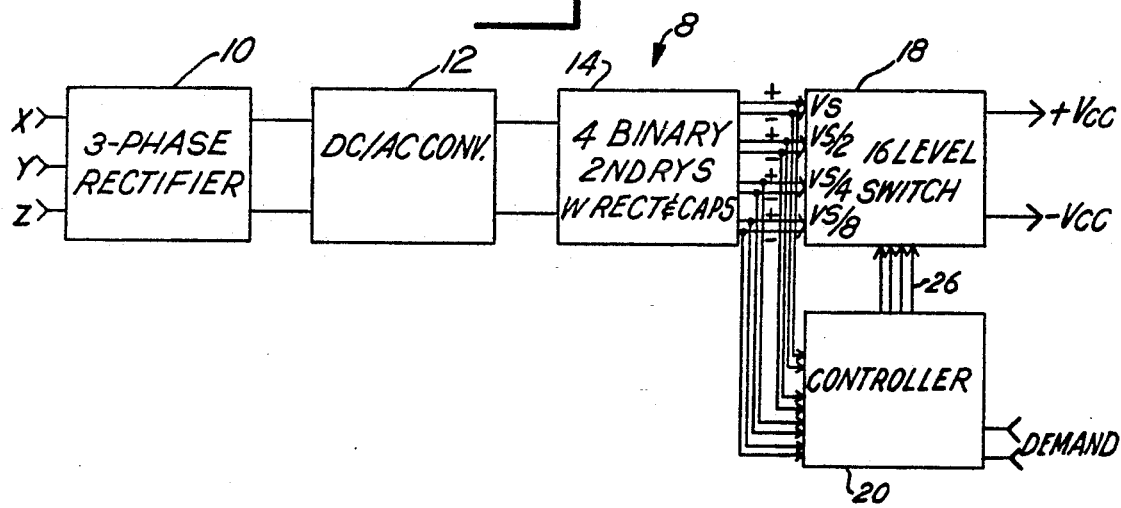
FIG. 1 is a block diagram of the sixteen level power supply and asynchronous controller of this invention.

FIG. 1 illustrates in block diagram form the power supply 8 of this invention. Three-phase voltage supply lines designated X, Y and Z are connected to the input of a three-phase rectifier 10. The D.C. output voltage of rectifier 10 is connected to a D.C. to A.C. converter 12. The output of converter 12 is connected to a transformer circuit 14 having four secondary windings. The four secondary windings of transformer circuit 14 are connected to separate rectifiers and filter capacitors (not shown) as is common. The rectified/filtered outputs of the secondary windings constitute the unregulated voltage sources Vs, Vs/2, Vs/4 and Vs/8 which are controlled by the sixteen level switch 18 and controller 20 of this invention.

The secondary winding outputs or voltage sources are connected to the sixteen level switch 18. Switch 18 includes positive Vcc and negative Vcc power outputs for connection to a load i.e. power amplifier (not shown).

A controller 20 is provided for monitoring a demand signal and voltage source levels and driving 16 level switch 18 accordingly. Controller 20 is connected to switch 18 by switch enable lines 26.

PRIOR ART

Figure 2A:
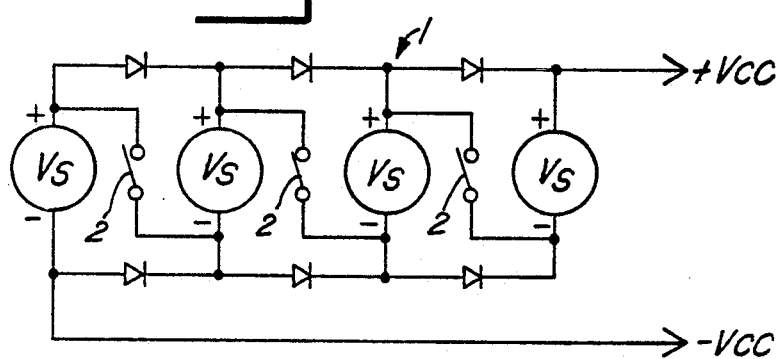
FIG. 2a is a schematical diagram of the prior art switchable power supply.

FIG. 2a illustrates a prior art switchable DC power supply 1. In essence, as a switch 2 is closed, its associated voltage source Vs is switched from a parallel configuration with the remaining voltage sources to a series configuration. A more thorough explanation of the operation of the switchable power supply of FIG. 2a may be had by reference to my U.S. Pat. No. 4,788,452. The limitations of the power supply of FIG. 2a are discussed earlier in the background section of this specification. It should be reiterated here and should be obvious from the figure that in order to make a sixteen level power supply using the circuit of FIG. 2a, sixteen separate voltage sources and fifteen switches would be required. Such a system would be obviously cost prohibitive to manufacture or use.

Switch Configuration of this Invention

Figure 2B:
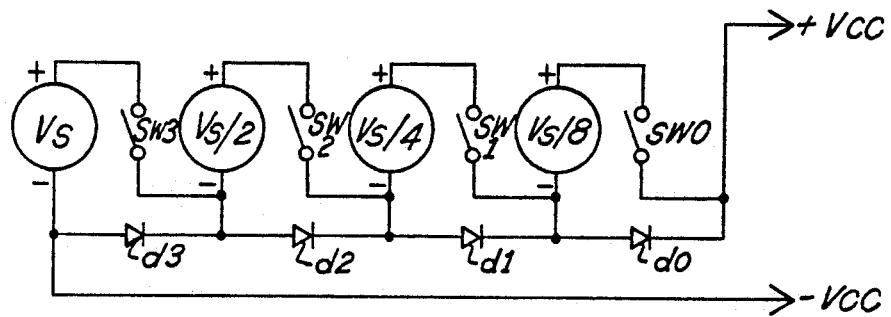
FIG. 2b is a schematical diagram of the switchable power supply of this invention.

FIG. 2b illustrates in schematical form the interconnection of the four voltage sources (Vs, Vs/2, Vs/4 and Vs/8.) from transformer circuit 14 relative to switches SW0-SW3 of sixteen level switch 18. Referring to the four voltage sources illustrated in FIG. 2b it should be understood that the actual voltage value is relatively unimportant. The relationship between voltage source values is however, important. Therefore, the designation Vs/2 indicates the value of the voltage source Vs/2 to be one half the value of the Vs voltage supply. The designation Vs/4 indicates the value of the Vs/4 voltage source to be one fourth the value of the Vs voltage source and one half the value of the Vs/2 voltage source. Accordingly, Vs/8 indicates the value of voltage source Vs/8 to be one eighth the value of the Vs voltage source, one fourth the value of the Vs/2 voltage source and one half the value of the Vs/4 voltage source.

It should be understood that switches SW0-SW3 of FIG. 2b are illustrated in schematical form as a single pole/single throw switch for illustrative purposes only. The preferred embodiment of switches SW0-SW3 is illustrated in FIG. 3 and discussed in detail below.

In operation, the circuit of FIG. 2b would function as follows to vary the voltage output from the circuit. Initially with all switches SW0-SW3 open the voltage across the Vcc terminals is zero. If switch SW0 is closed and all other switches are open voltage source Vs/8 is placed in series between +Vcc and −Vcc. Current flow is established from −Vcc through diodes d3, d2 and d1 through Vs/8 and switch SW0 to +Vcc. If only SW1 is closed current flow is established from −Vcc through diodes d3, d2 through Vs/4, switch SW1, diode d0 to +Vcc. This pattern of current flow is followed if either switch SW2 or SW3 were closed while the remaining switches were open.

It can be seen and should be understood that the voltage at +Vcc and −Vcc can be varied in four steps from Vs/8 to Vs by closing only one switch at a time. Stopping here would require 16 different voltage source values to have a 16 level switch. However, by using basic digital counting and considering switches SW0-SW3 not as four separate switches but rather as bits of a four bit switch it is possible to obtain 16 different voltage levels from 0 volts (all switches open) to 15 Vs/8 volts (all switches closed). The particular current paths established and voltage outputs accomplished to produce the 16 levels will not be discussed in detail as such would be understood to one skilled in the art after viewing FIG. 2b. However, in the interest of providing a complete disclosure the switch arrangement and current paths established for an output voltage of 5 Vs/4 will be discussed as an example. To produce the output voltage of 5 Vs/4, switch SW1 and switch SW3 would be closed. In other words, a binary representation of control word of the switch status would be 1010. Current flow would then be established from −Vcc through Vs, SW3 diode d2, Vs/4, SW1 and diode d0 to +Vcc. Therefore voltage sources Vs and Vs/4 would be placed in series with their combined voltage output of 5 Vs/4 placed at the +Vcc and −Vcc terminals. It should be clear at this point that any combination between 0000 and 1111 could be used as a control word for switches SW0-SW3.

16 LEVEL SWITCH

The diagram of FIG. 3 illustrates in schematic form the preferred embodiment of the sixteen level switch 18 illustrated as single pole single throw switches in FIG. 2b. Each power switch is identical in construction, therefore only SW0 will be described in detail.

Positive and negative switch enable lines 26 from the controller 20 (FIG. 1) are connected to the input of a high speed optical transmitter and receiver 22 and 24 which electrically isolates the control circuitry from the associated voltage source Vs/8 for protection of the control circuitry and human life. The transmitter 22 is optically linked to the Schmidt trigger receiver 24 having its output connected to a buffer 28. A resistor 149 is connected between the output of receiver 24 and the negative biasing voltage of buffer 28. The output of buffer 28 is connected through a current limiting resistor 30 to the gate of a MOSFET 32. MOSFET 32 has its source lead connected to +Vcc output and its drain lead connected to the positive output terminal of Vs/8. A body diode 34 is intrinsic to MOSFET 32. MOSFET 32 is connected to a protection circuit 36 for monitoring the MOSFET.

Each switch SW0-SW4 includes a protection circuit 36 for protecting its MOSFET from being gated on and having a substantial sustained Vds. The protection circuit 36 for each MOSFET is identical therefore, only one is fully illustrated and described. In the continued interest of brevity the description of the protection circuit will be in the general and not the specific since the protection circuit does not constitute a novel feature of this invention.

Each protection circuit includes comparators 121-124. Comparator 123 and comparator 124 are connected so as to monitor the gating voltage to its MOSFET and the Vds of the MOSFET respectively. Comparators 123, 124 are configured as illustrated open collector and include resistors 140-144 connected as illustrated in common voltage divider manner. A capacitor 120 is connected between the output of comparators 123, 124 and their local +Vcc supply. The outputs of comparators 123, 124 are connected to the inverting input of comparator 122. A reference voltage is established at the non-inverting input of comparator 122 by resistors 126 and 128 connected as illustrated. A resistor 129 is connected between the positive D.C. voltage source at resistor 131 and the inverting input of comparator 122. The output of comparator 122 is connected to the inverting input of comparator 121. A reference voltage is established at the non-inverting input of comparator 121 by zener diodes 130, 150. The output of comparator 121 is connected to the enable pin of opto-receiver 24. A pull up resistor 145 is connected between the positive D.C. voltage source at resistor 131 and the output of comparator 121. An electrolytic capacitor 146 is connected between the positive D.C. voltage source at resistor 131 and the base of NPN transistor 147. A resistor 148 is connected between the emitter lead of transistor 147 and capacitor 146.

In operation, when comparator 123 senses a gating voltage at MOSFET 32 and comparator 124 senses a Vds in excess of a predetermined maximum, the comparators shift into their open collector state which allows capacitor 120 to charge through resistor 129. Capacitor 120 is provided to give the protection circuit a delay to prevent its acting on fast transients. When capacitor 120 charges above the reference voltage at comparator 123 as determined by zener diode 131 the comparator 122 switches its output to a logical low voltage discharging capacitor 133.

When capacitor 133 is discharged fully the NPN transistor turns on which pulls down the reference voltage at comparator 122 below the voltage at the inverting input essentially latching the comparator 122 low. The low voltage at the inverting input of comparator 121 causes a high voltage at its output which disables opto-receiver 24 to prohibit gate drive to the MOSFET. With gating prohibited comparator 123 switches into a low voltage output state. If the Vds should decrease below the predetermined maximum comparator 124 would also switch to its low voltage state.

If either comparator 123, 124 are low, comparator 122 switches its output to an open collector state allowing capacitor 133 to charge through resistor 134. When capacitor 133 charges above the reference voltage determined by zener diode 131, comparator 121 switches low to enable receiver 24 and allow gate drive to the MOSFET. Therefore, it can be seen that at sustained high Vds conditions the protection circuit cycles the gating enable on and off to prevent overheating of the MOSFET.

The voltage supply connections required for each op amp and buffer are not shown in the interest of clarity as such are abundantly clear to those skilled in the art.

Asynchronous Controller

The asynchronous controller 20 of this invention is illustrated in block diagram form in FIG. 4 and includes supply voltage monitors 38 having inputs connected across their respective voltage sources as indicated. The output from each of the supply voltage monitor 38 is connected to input(s) for the comparator circuitry 40 for a comparison with a demand signal from the summing circuit 42. The comparator circuitry compares the demand signal with the voltage available from voltage supplies Vs, Vs/2, Vs/4 and Vs/8 as determined by monitors 38. Comparator circuitry 40 determines the specific voltage required by the amplifier (load) at +Vcc and −Vcc and passes the desired switch configuration in the form of a four bit command word to a sequence checking circuit 44. Sequence checking circuit 44 ensures a single count step increase in voltage to the load by requiring total binary count up. In essence this function could be though of as deglitching the comparator circuitry output for the purpose of preventing an improper count up sequence i.e. skipping a count. This is especially important during a major bit roll over as experienced in counting from 0011 to 0100 and 0111 to 1000. The sequence checking circuitry 44 outputs the "deglitched" command word to a latch circuit 46. The output from latch circuit 46 is connected to sixteen level switch 18 and constitutes the positive switch enable lines previously discussed.

General Controller Operation

In general, controller 20 operates in the following manner. Supply voltage monitors 38 constantly monitor the voltage from their associated voltage source and output a voltage to comparator circuitry 40. The supply voltage monitors in essence constantly provide information to the controller on the available voltage from the unregulated voltage sources. Similarly, summing circuit 42 monitors the output voltage from the amplifier (not shown) and voltages proportional to current in the amplifier in a summing manner and outputs a voltage to the comparator circuitry signifying amplifier supply voltage demand. Comparator circuitry 40 compares the demand signal to the available voltage and outputs a four bit control word to sequence checking circuit 44 representative of the required switch configuration. Circuit 44 deglitches the control word during count up to ensure proper sequencing during a major bit carry over and has no effect during count down. The deglitched control word is then passed to latch circuit 46. If the new control word passed by sequencing circuit 44 is larger than the previous word it is immediately latched, or in other words passed to sixteen level switch 18. If the new control word is the same as the previous word no action is taken by the latching circuit. If, however, the new control word is less than the latched output (previous control word) a timer is started and the new control word admitted and latched upon timer timeout. In essence, the latching circuit provides a delay on countdown only. This delay on count down is included to prevent cycling a switch on and off rapidly to reduce activity noise and switch heating due to high frequency switching.

Detailed Controller Construction

Figure 5:
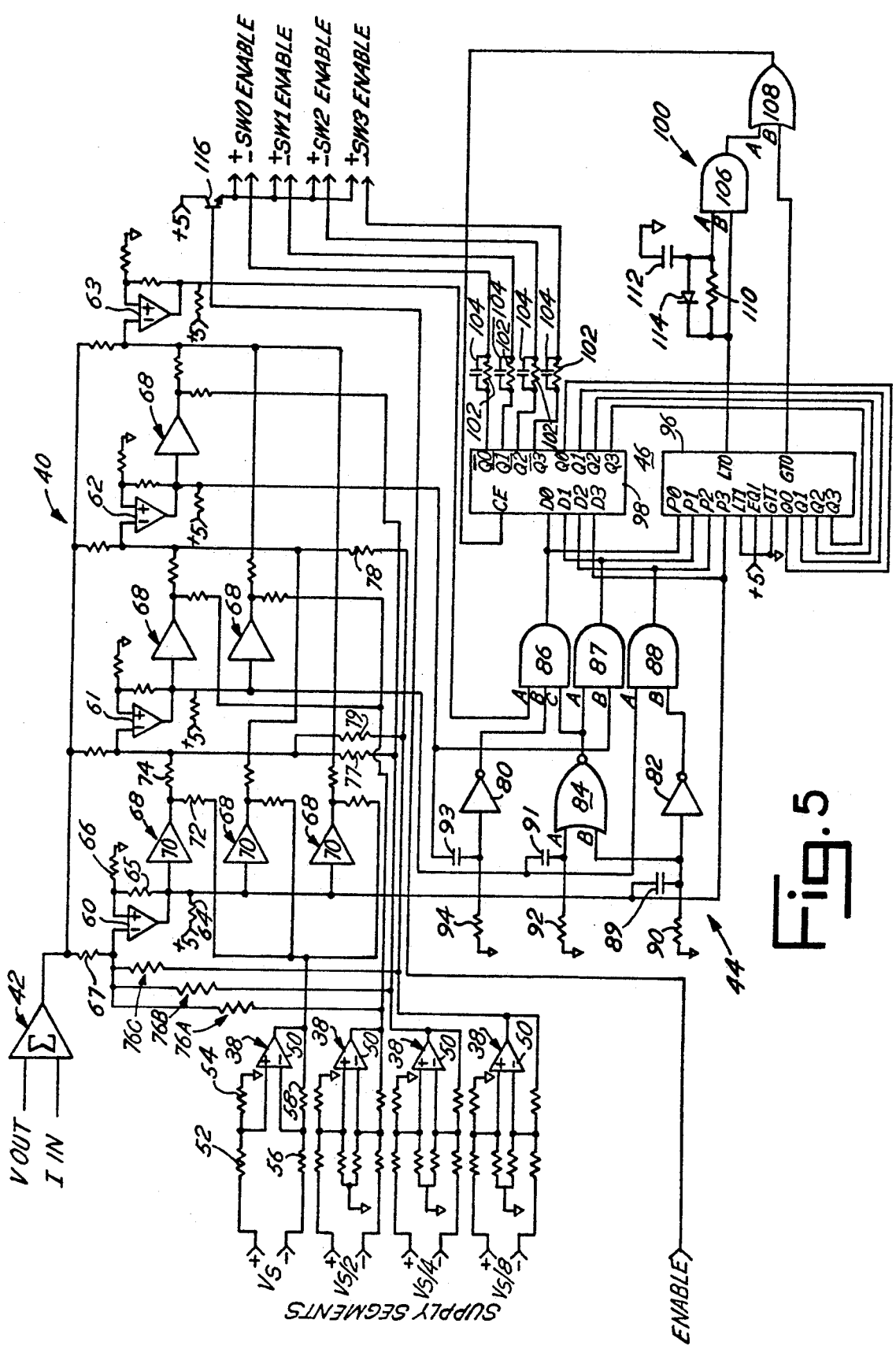
FIG. 5 is a schematical diagram of the sixteen level controller of this invention.

A detailed schematic of the sixteen level controller is illustrated in FIG. 5. Each supply voltage monitor circuit 38 is identical in function, therefore only one need be described in detail. Each supply voltage monitor 38 includes an op-amp 50 having its non-inverting input connected through a voltage divider consisting of resistors 52, 54 to the positive voltage output of its associated voltage source. The inverting input of op-amp 50 is connected by a voltage divider consisting of resistors 56, 58 to the negative voltage output of its associated voltage source. Resistor 58 is connected between the output of op-amp 50 and inverting input to provide required feedback for the op-amp. It should be obvious to one skilled in the art that the value of the resistors 52, 54, 56 and 58 used as voltage dividers associated with the Vs supply voltage monitor as described would be necessarily larger than the values of resistors used with the supply voltage monitors associated with the smaller value voltage supplies.

The comparator circuitry 40 of controller 20 includes four comparators 60-63 the outputs of which constitute the control word. The comparators are oriented such that comparator 60 would equate to the most significant bit (MSB) of the control word generated by comparator circuitry 40. Comparator 63 would accordingly be the least significant bit (LSB) of the control word. Comparator 60 of the comparator is connected to a voltage divider network consisting of series resistors 64, 65, 66 connected between a positive five volt supply and ground. Resistor 65 is connected between the output of comparator 60 and non-inverting input of the comparator. Resistor 66 is connected between non-inverting input and ground. Resistor 64 is connected between the positive five volt supply and the comparator output. A resistor 67 is connected between the output of the summing circuit and the inverting input of the comparator 60. The remaining comparators 61-63 of comparator 40 circuitry are configured, as illustrated, in the same manner as MSB comparator 60 thus far described and therefore need not be described in detail.

Three lesser significant bit suppression circuits 68 are connected to the output of MSB comparator 60 of comparator circuit 40. Each suppression circuit 68 includes an open drain output buffer 70 having its input connected to the output of a comparator 60. A resistor 72 is connected between output of buffer 70 and the output of op-amp 50 for the Vs voltage source monitor. A resistor 74 is connected between the output of buffer 70 and inverting input of a lesser significant bit comparator. As illustrated, suppression circuits 68 associated with each comparator 60-62 are identically configured with only the resistance values differing, therefore only one need be discussed in detail. Obviously, the input and output connection for each suppression circuit will be different as explained here. Each suppression circuit from a particular comparator has its buffer input connected to the output of that comparator. Suppression circuits 68 of FIG. 5 are arranged such that the uppermost suppression circuit associated with a particular comparator 60-62 is connected to the inverting input of the next adjacent lesser significant bit comparator if any. The next lower adjacent suppression circuit, if any, has its output connected to the inverting input of the second lesser significant bit comparator if any. Finally, the third or lower most suppression circuit associated with MSB comparator 60 only has its output connected to the inverting input of LSB comparator 63. It should be noted that since LSB comparator 63 is the least significant bit of the control word, no lesser significant bit suppression circuits are associated with its output.

The output of voltage supply monitor 38 for the Vs/2, Vs/4, and Vs/8 voltage supplies is connected through resistors 76A, 76B, and 76C respectively, to the inverting input of the MSB comparator 60. The outputs of voltage supply monitor 38 for the Vs/4 and Vs/8 voltage supplies are connected through resistors 77 and 79 respectively to the inverting input of the MSB comparator 61. The output of voltage supply monitor 38 for the Vs/8 voltage supply is connected through resistor 78 to the inverting input of the MSB comparator 62. Unlike in commonly owned U.S. Pat. No. 5,045,990, the output of voltage supply monitor 38 for the Vs voltage supply is not connected to the input of comparator 60. Additionally, resistor 76 utilized in U.S. Pat. No. 5,045,990, is replaced with resistors 76A, 76B and 76C, each now connected respectively as previously described to the output of the voltage supply monitor for the Vs/2, Vs/4 and Vs/8 voltage supplies. The output voltage of the comparators 60-63 constitute the control word passed to input of sequence checking circuit 44. The use of resistors 76A, 76B, and 76C in conjunction with the Vs/2, Vs/4 and Vs/8 voltage sources respectively connected to the inverting input of the MSB comparator 60, and the Vs/4 and Vs/8 voltage sources in conjunction with resistors 77 and 79 respectively connected to the inverting input of the MSB comparator 61, and the Vs/8 voltage supply in conjunction with resistor 78 to the inverting of MSB comparator 62 allows the controller to output the correct control word and hence, voltage supply, when the demand voltage for the amplifier is between integers (e.g. 3.6, 4.25, 8.5). For example, without the change, a demand voltage of 8.5 would only output the Vs voltage supply (assuming Vs=8), which is not enought to power the amplifier. With the change, the supply voltage would be 9Vs/8 or 9 voltage which would be sufficient.

Sequence checking circuit 44 includes a pair of inverters 80, 82, a NOR gate 84 and three AND gates 86-88 as illustrated in FIG. 5. The output of MSB comparator 60 is capacitively coupled by capacitor 89 to the input of inverter 82. A resistor 90 is connected between the input of inverter 82 and ground. The output of inverter 82 is connected to the B input of AND gate 88. The output of comparator 61 is capacitively coupled by capacitor 91 to the A input lead of NOR gate 84 and to the A lead of AND gate 88. A resistor 92 is connected between the A input lead of NOR gate 84 and ground. The B input lead of NOR gate 84 and the input lead of inverter 82 are connected together. The output lead of NOR gate 84 is connected to the A lead of AND gate 87. The output of comparator 62 is capacitively connected by a capacitor 93 to the input of inverter 80 and is directly connected to the B input of AND gate 87. A resistor 94 is connected between the input of inverter 80 and ground. The output of inverter 80 is connected to the B lead of AND gate 86. The output of comparator 63 is connected to the A input lead of AND gate 86. The C input lead of AND gate 86 is connected to the A input lead of AND gate 87. The output of MSB comparator 60 and the output of AND gates 86-88 form the output lines for the count sequence checking circuit 44 which are connected to latch circuit 46 to pass the sequenced control word to the latch circuit.

Latch circuit 46 includes a digital comparator 96, a latch 98 and a delay circuit 100. The output lines from circuit 44 as discussed previously are connected to the d0-d3 inputs on the latch 98 as well as the P0-P3 inputs on the digital comparator 96. The Q outputs Q0-Q3 of latch 98 are connected to Q0-Q3 inputs on digital comparator 96, respectively. The Q0not-Q3not outputs of latch 98 are connected through current limiting resistors 102 and output as negative switch enables for switches SW0-SW3. A capacitor 104 is connected across each resistor 102. A delay circuit 100 is connected to the comparator's LTO (Less than output) terminal. The delay circuit 100 includes an AND gate 106 with its output connected to the A input lead of an OR gate 108. The output of OR gate 108 is connected to the latch enable (LE) pin on latch 98. The B input leads of OR gate 108 is connected to the (Greater than Output) GTO pin on digital comparator 96. A resistor 110 is connected between the A and B input leads on AND gate 106. The B input lead of the AND gate 106 is connected to LTO pin of the comparator 96. A capacitor 112 is connected between the A input lead of the AND gate 106 and ground. A diode 114 is connected across resistor 110.

An NPN transistor 116 is included for supplying the positive switch enable line at its emitter lead. The collector lead of transistor 116 is connected to a +5 volt supply. The base lead is connected to an enable signal terminal in the amplifier (not shown).

Detailed Controller Operation

The following constitutes a description of the controller operation with specific reference to voltage supply monitor 38 associated with the Vs voltage supply and the MSB comparator 60 along with the associated lesser-bit suppression circuits 68. It being understood that each supply voltage monitor circuit 38 and remaining comparators 61-63 function in the same manner to produce the control word to the count sequence checking circuitry 44.

Referring now to FIG. 5, it can be seen that both the demand signal coming from summing circuit and the output of monitor circuits 38 associated with the Vs/2, Vs/4, and Vs/8 are connected via resistors 67, 76A, 76B, 76C respectively to the inverting input of comparator 60. The output from the summing circuit is a negative DC voltage value while the output from monitor circuits 38 is a positive DC voltage value. Therefore if the value of the positive DC voltage output from monitors 38 is greater than the negative DC voltage from the summing circuit the voltage at the inverting input terminal inverting input of comparator 60 is positive causing a low output from the comparator. If, however, the negative DC voltage from the summing circuit is greater than the positive DC voltage from the voltage supply monitors 38, the resulting voltage at the inverting input of comparator 60 is negative causing a high or positive output from comparator 60. Given the identical configuration of comparator 60-63 and their respective voltage supply monitors 38, it should be understood that the comparison between demand signal and the voltage supply signal is carried out for each comparator 60-63. It should also be understood as has previously been defined in this specification that the voltage sources have scaled voltage values as indicated by the designations of Vs, Vs/2, Vs/4 and Vs/8. Therefore, the positive voltage out of voltage supply monitors 38 will depend primarily upon the value of the voltage source to which it is associated. Accordingly, LSB comparator 63 having its inverting input connected to the demand signal as mentioned previously would produce a high output on comparator 63 at a much lower demand signal than would comparator 60. Given that the voltage supply monitors 38 and summing circuitry are constantly monitoring their respective voltage sources and amplifier input signals, the comparison between the demand signal voltage and the voltage supply monitor outputs is a continually occurring process asynchronous in nature. As mentioned previously, the four outputs from comparators 60-63 constitute the control word passed to circuit 44. Assuming that the amplifier output signal and input current is constantly changing in response to its input signal, the voltage required by the amplifier is constantly changing. Therefore the comparison necessarily is a continuous function.

The lesser significant bit suppression circuits function in the following manner to initially turn off comparators representing a lesser significant bit when a greater significant bit comparator is turned on. Referring to FIG. 5 and the shutdown circuits 68 associated with comparator 60 it can be seen that the inputs of the suppression circuits are connected to the output of the comparator. Therefore, when a high voltage appears at the output of comparator 60 it opens the output of buffers 70 and allows the monitor 38 voltage of supply Vs to pass through resistors 72 and 74 as a positive voltage to the inverting input of lesser significant comparator 61, 62 and 63. The increased positive voltage at the inverting input of comparator 61, 62 and 63 causes the comparators to turn off or in other words produce a low voltage output when the additional positive voltage from the suppression circuit combined with the sum of the voltage supply monitor signals is greater than the demand signal. If the demand signal increases to overcome the additional positive voltage for a suppression circuit combined with the voltage supply monitor signal the comparator will produce a high output in the manner described above. The suppression circuits ensure a minimum configuration of voltage sources will be used at any time to protect the amplifier and provide for increased power supply efficiency.

Deglitching circuit 44 includes the logical gate configuration as illustrated in FIG. 5. Circuit 44 functions to prevent a sequencing error during count up, specifically during a major bit carry or rollover. A major bit carry occurs when counting up in binary from 0001 (arabic 1) to 0010 (arabic 2), from 0011 (arabic 3) to 0100 (arabic 4) and from 0111 (arabic 7) to 1000 (arabic 8). In each bit carry instance it is imperative that the lesser significant bits be zeroed. Therefore, the deglitching circuitry 44 momentarily zeroes lesser significant bits upon a major bit carry being detected. The properly sequenced control word is output to latching circuit 46.

Latching circuit 46 described previously is included to provide a delay on count down of the control word prior to passing the control word to the switches. The control word input to the latching circuit is connected to the data inputs of latch and digital comparator. The Q outputs of the latch are connected to the Q0-Q3 inputs of digital comparator. If the control word passed to the latch circuit is greater than the previous control word at the Q0-Q3 latch outputs, the comparator places a logical high voltage level on the GTO (greater than output) pin. A high logic level at OR gate input B causes the OR gate output to switch high and enable the latch. The enabled latch then "latches" the control word at its input pins to its output pins. The Qnot output pins are connected through a current limiting resistor and speedup capacitor and constitute the negative switch enable lines for switches SW0-SW3. If, however, the control word input to the latching circuit is less than the low and the LTO (Less Than Output) pin is switched to a logical high voltage level. A high voltage at LTO pin causes a high level at AND gate input B and also begins to charge capacitor 112 at a rate determined by resistor 110. When the voltage across the capacitor charges to a logical high level the output of AND gate switches high which switches the OR gate output high to enable the latch as described earlier. The delay on count down is desirable to prevent toggling a switch and its associated voltage source on and off at a high frequency thereby preventing overheating of the switches.

The emitter of NPN transistor 116 provides the positive voltage line for the switch enables when the transistor is biased on by an enable signal at its base originating from within the amplifier. When the Qnot output for a particular switch enables switches low, a current path is established from the positive switch enable to the negative switch enable.

It should be understood that the operation of the controller is dynamic in nature, constantly monitoring voltage signals described previously and outputting control words to the sixteen level switch is response. It is anticipated that the sixteen level controller and power supply of this invention will be associated with an amplifier having rapidly changing output power requirements.

It should also be understood that the invention is not to be limited to the precise details above, but, may be modified within the scope of the appended claims.

I claim:

1. A device for converting a plurality of analog voltage sources into a digital multibit word, said analog voltage sources ranging from a most significant voltage source to a least significant voltage source, said device including a plurality of comparing means, each said comparing means associated with a corresponding one of said analog voltage sources, a most significant one of said comparing means having its input adapted for connection to an analog reference voltage at least one of said analog voltage sources having a lesser significance, a least significant one of said comparing means having its input operatively associated with an output of at least one of said comparing means of greater significance, said least significant comparing means further having its input adapted for connection to said analog reference voltage, each remaining one of said comparing means having its input operatively associated with the output of at least one of said comparing means having a greater significance, each remaining one of said comparing means having its input operatively associated with at least one of said analog voltage sources having a lesser significance, and each remaining one of said comparing means having its input operatively associated with said analog reference voltage, each of said comparing means for comparing the value of said analog reference voltage source to the value of the sum of the outputs of said analog voltage sources and of said comparing means so connected to said input of each of said comparing means, each said comparing means having an output voltage constituting one bit of said digital multibit word, said plurality of comparing means operatively associated with one another such that the output voltage of said most significant comparing means constitutes a most significant bit of said digital multibit word and the output voltage of said least significant comparing means constitutes the least significant bit of said digital multibit word, said output voltage of each of said comparing means being a first binary voltage level when the value of the sum of the outputs of the lesser significance analog voltage sources so connected to each of said comparing means are of lesser than or the same as the value of said analog reference voltage source, each of said comparing means being arranged for asynchronously switching said output voltage between said first binary voltage level and a second binary voltage level.

2. The device of claim 1 wherein each of said comparing means includes a comparator circuit having an input lead and an output lead, said output voltage of each comparing means being present at its output lead, at least one of said analog voltage sources and said analog reference voltage source being connected to said input lead of each comparator, said analog reference voltage source and said analog voltage sources being of opposite voltage polarities.

3. The device of claim 2 further including a switch means connected between the output lead of said first comparing means and said input of said second comparing means, said switch means having an output for connection to output of said one voltage source for connection to output of the said first comparing means, said switch means for suppressing the output of said one voltage source when said output of said first comparing means is a binary false voltage level.

4. A multiple level DC power supply having a pair of output terminals for presenting a plurality of DC voltage values to a load connected to said output terminals, said power supply including, a plurality of DC voltage sources, switch means connected to each of said voltage sources for selectively connecting said DC voltage sources across said power supply output terminals, controller means operatively associated with said switch means and said DC voltage sources and said load for independently activating at least one of said switch means when a voltage value required by said load is greater than or the same as the voltage value at said output terminals, wherein said controller means includes a voltage source monitoring means connected to each of said DC voltage sources for monitoring said DC voltage sources and outputting separate analog voltages representative of the voltage value of each of said DC voltage sources, a load monitoring means operatively associated with said load for outputting an analog voltage representative of a power supply voltage value required by said load, comparator means connected to each of said source monitoring means and to said load monitoring means for comparing the analog voltages and outputting a multi-bit binary word, said multi-bit word having a most significant bit and scaled lesser significant bits, said comparator means includes a plurality of comparing means, a first of said comparing means having its input connected to said load monitoring means and all except one of said voltage sources monitoring means, said first comparing means having its output connected to said one voltage source monitoring means, a second of said comparing means having its input operatively associated with the output of said first comparing means, said second comparing means further having its input connected to said load monitoring means, each of said first and second comparing means for comparing the value of the sum of the outputs of said analog voltages from said voltage sources monitoring means connected to the input of the said comparing means to the value of said analog voltages from said load monitoring means comparing means having an output voltage constituting one bit of said digital multi-bit, said plurality of comparing means operatively associated with one another such that the output voltage of said first comparing means constitutes a most significant bit of said digital multi-bit word and the output voltage of said second comparing means constitutes the least significant bit of said multi-bit word, the output voltage of each of said comparing means being a binary true voltage level when the value of the sum of outputs of the voltage sources for connection to said input of the said comparing means are of lesser than or the same as the value of said reference voltage source, said output voltage of each of said comparing means being asynchronously switched by said comparing means between said binary true voltage level and a binary false voltage level.

5. The device of claim 4 including a third of said comparing means having its input connected to said load monitoring means and all except one of said voltage source monitoring means connected to the said first comparing means, said third comparing means having its output connected to the last mentioned of said one voltage source monitoring means, said third comparing means having its input operatively associated with said output of said first comparing means, said second comparing means having its input connected to said output of said fourth comparing means, said third comparing means having its output voltage constituting a bit of said multibit word being of lesser significance than said most significant bit and greater significance than said least significant bit.

6. The device of claim 5 including a fourth comparing means having its input connected to said load monitoring means and all except one of said voltage source monitoring means connected to the input of said third comparing means, said fourth comparing means having its output connected to the last mentioned of said one voltage source monitoring means, said fourth comparing means having its input operatively associated with said output of said third comparing means, said second comparing means having its input connected to said output of said fourth comparing means, a bit of said multibit word being of lesser significance than said bit of said third comparing means, said fourth comparing means having its output voltage constituting a bit of said multibit word being of lesser significance than said bit of said third comparing means and greater significance than said least significant bit.

* * * * *